(12) United States Patent
Riant et al.

(10) Patent No.: US 7,405,855 B2
(45) Date of Patent: Jul. 29, 2008

(54) RECONFIGURABLE OPTICAL FILTER

(75) Inventors: Isabelle Riant, Orsay (FR); Christian Belouet, Sceaux (FR)

(73) Assignee: ALCATEL, Paris (FR)

( * ) Notice: Subject to any disclaimer, the term of this patent is extended or adjusted under 35 U.S.C. 154(b) by 630 days.

(21) Appl. No.: 10/828,205

(22) Filed: Apr. 21, 2004

(65) Prior Publication Data

US 2007/0183048 A1   Aug. 9, 2007

(30) Foreign Application Priority Data

Apr. 22, 2003   (FR) .................................. 03 04911

(51) Int. Cl.
*G02F 1/03* (2006.01)
*G02F 1/07* (2006.01)
*G02B 6/34* (2006.01)

(52) U.S. Cl. ........................................ 359/244; 385/37
(58) Field of Classification Search ................ 359/566, 359/569, 258, 244, 578; 385/37, 124
See application file for complete search history.

(56) References Cited

U.S. PATENT DOCUMENTS

| 5,023,139 A * | 6/1991 | Birnboim et al. ............ 428/402 |
| 2002/0085605 A1 | 7/2002 | Hatori |
| 2003/0016907 A1 | 1/2003 | LoCascio et al. |

FOREIGN PATENT DOCUMENTS

| GB | 2 241 348 A | 8/1992 |
| WO | WO 03/012500 A1 | 2/2003 |
| WO | WO 03/025626 A2 | 3/2003 |

OTHER PUBLICATIONS

A. Melloni et al, "All-Optical Switching In Phase-Shifted Fiber Bragg Grating", IEEE Photonics Technology Letters, IEEE, Inc., New York, US, vol. 12, No. 1, Jan. 2000, pp. 42-44, XP000912613.
Y. Jeong et al, All-Optical Signal Gating in Cascaded Photonics Technology Letters, IEEE Photonics Technology Letters, IEEE, Inc., New York, US, vol. 12, No. 9, Sep. 2000, pp. 1216-1217, XP000968646.
P. Nandakumar et e al, "Quantum size effects on the third order optical nonlinerarity of CdS quantum dots in Nafion", Optics Communications, North-Holland Publishing Co., Amsterdam, NL, vol. 185, No. 4-6, Nov. 15, 2000, pp. 457-465, XP004223709.

* cited by examiner

*Primary Examiner*—Alessandro Amari
(74) *Attorney, Agent, or Firm*—Sughrue Mion, PLLC

(57) ABSTRACT

A tunable optical filter comprising an index grating produced in a waveguide defining a longitudinal direction of propagation of an incident optical signal, said grating being defined by a plurality of optical parameters, is characterized in that the optical guide contains semiconductor nanoparticles and in that the index grating is made up of a refractive index variation in the guide that is at least partly induced by a Kerr effect linked to the $3^{rd}$ order dielectric susceptibility ($\chi^3$) of said nanoparticles, at least one of said parameters of said index grating being modified by application of an optical control signal coupled into the guide and propagating longitudinally in said guide.

11 Claims, 1 Drawing Sheet

RECONFIGURABLE OPTICAL FILTER

CROSS-REFERENCE TO RELATED APPLICATION

This application claims priority from French Patent Application No. 0304911, filed in the French Patent Office on Apr. 22, 2003, the disclosure of which is incorporated herein by reference in its entirety.

BACKGROUND OF THE INVENTION

1. Field of the Invention

The field of the present invention is that of optical filters disposed in optical waveguides.

2. Description of the Related Art

Optical filters, such as Bragg gratings written optically into optical waveguides, are finding increasingly important applications in optical systems, in which they are used for applications such as wavelength selection, gain equalization, and chromatic dispersion compensation, for example.

A waveguide conventionally comprises an optical core, the function of which is to transmit and possibly to amplify an optical signal, surrounded by optical cladding, the function of which is to confine the optical signal within the core. To this end, the refractive index $n_1$ of the core and the refractive index $n_2$ of the cladding are such that $n_1 > n_2$. Thus the core and the cladding form a waveguide. As is well known in the art, the propagation of an optical signal in a monomode waveguide is divided between a fundamental mode guided in the core and secondary modes guided over a certain distance in the core+optical cladding combination, the modes also being known as cladding modes. The cladding is itself surrounded by an external medium whose refractive index $n_3$ is either greater than or less than $n_2$. The core+cladding combination associated with the external medium also forms a waveguide. A waveguide may consist of an optical fiber or a planar guide.

The core and/or the cladding of the guide may be doped, for example with germanium (Ge), to render it photosensitive for writing a Bragg grating. A Bragg grating conventionally comprises a periodic disturbance to the refractive index in the guide, which forms an index grating. This index disturbance is obtained by localized irradiation of the guide through a phase mask which determines the period $\Lambda$ of the grating. The intensity and the modulation of the irradiation during writing define a Bragg grating characterized by the Bragg relation $\lambda_B = 2\Lambda \cdot n_{\mathit{eff}}$, where $\Lambda$ is the period of the grating and $n_{\mathit{eff}}$ is the effective index of the fundamental mode guided in the core of the optical fiber.

This relation characterizes a short-period Bragg grating. A short-period grating perpendicular to the axis of the fiber constitutes a reflective spectral filter centered on the Bragg wavelength $\lambda_B$, conventionally used in filtering applications or in multiplexing applications for adding or dropping a transmission wavelength. The Bragg gratings are associated with one or more components with a plurality of input-output channels, for example optical circulators or couplers.

Numerous forms of Bragg grating have been developed. Thus chirped gratings, in which the period $\Lambda$ varies along the grating, are conventionally used in chromatic dispersion compensation applications.

Slanted Bragg gratings (SBG) and long-period gratings (LPG) are conventionally used in gain equalization applications. Such gratings are designed to enable coupling of the fundamental mode into the cladding modes, enabling filtering without reflection at the coupling wavelengths and eliminating the need for optical isolators.

SUMMARY OF THE INVENTION

Optical filters are integrated into optical systems and are generally associated with optical amplifiers disposed in optical repeaters distributed along transmission lines at regular intervals. The optical amplifiers generally do not provide the same amplification for all wavelengths of the signals transmitted on the various channels of the same transmission line. In particular, the development of high-bandwidth wavelength division multiplexing (WDM) transmission applications has tended to accentuate amplification disparities over a given bandwidth. It is therefore necessary to associate in-line amplifiers with gain equalizing filters to re-establish the amplification disparities of the various transmission channels of an optical system.

Besides, for WDM networks installed on long-haul high bit rate links in particular, it is necessary to manage chromatic dispersion, the objective being to limit the widening of pulses by obtaining a substantially zero cumulative chromatic dispersion over the whole of the link for all wavelength values of the multiplex. Thus chromatic dispersion compensators using Bragg gratings may be inserted into the transmission line.

Unfortunately, optical systems often evolve with time and it is not rare for the parameters of an optical component such as a dispersion compensator gain equalizer to cease to be adapted to the specifications of real transmission systems. For example, this kind of evolution may be the result of ageing, temperature variation, localized intervention on the line, or adding optical modules or optical transmission channels after the line is installed. The original parameters of the various components of the optical system then become inappropriate.

Besides, in optical routing applications, there is a requirement for spectral filters that may be activated at a given wavelength, for example to switch a signal at that wavelength. For example, a filter may be set to a wavelength corresponding to a channel, in which case the signal associated with that wavelength is extracted, or to a wavelength between two wavelengths corresponding to two adjacent channels, in which case the signal is transmitted with no modification. However, if the channels are close together in the spectrum ($\leq 50$ GHz), it becomes difficult to place the filter between two channels without modifying the transmissions. The ideal would therefore be to have a filter that may be activated or not, as required.

It is therefore necessary to produce optical filters whose spectral response can be tuned dynamically to correspond to changes in the operating conditions of the optical systems into which they are incorporated, or "agile" or reconfigurable filters for use in optical routing applications and which may be selectively activated.

Numerous optical filters that may be tuned by external control signals exist already. Localized action on the guide or the external medium can locally modify the effective index of the guide and likewise the response of the filter conforming to the Bragg relation previously cited.

Prior art tunable filters are usually subjected to thermal stress (by a Peltier element or a heating element) or mechanical stress (by a piezoelectric or other actuator). Depending on the embodiment, such stresses shift the wavelength of the filter and/or introduce or modify a period variation (chirp).

Those prior art tunable filters necessitate external control systems, which are often massive. Those solutions are bulky and generally have a long response time for tuning the filter.

Incidentally, research is currently being carried out into inducing non-linear effects in a waveguide by a poling method, in order to be able to modify the refractive index of the waveguide dynamically afterwards. The poling method consists in creating, within the material whose refractive index is to be modified, a direction and a preferential sense in that direction that increase susceptibility to second order non-linearity.

A first method consists in applying a high electric field to a region of the guide that is simultaneously exposed to ultraviolet radiation. That optical poling method is described in particular in the paper by S. Matsumoto et al., "Crystallization and optical nonlinearity in $GeO_2$—$SiO_2$ glass poled with ArF excimer-laser irradiation", Journal of Applied Physics, Vol. 88, No. 12, p. 6993 (2000).

Another prior art poling method consists in applying the electric field to a guide region simultaneously subjected to a very high temperature. That thermal poling method is described in particular in the paper by A. C. Liu et al. "Improved nonlinear coefficient (0.7 pm/V) in silica thermally poled at high voltage and temperature", Electronics Letters, Vol. 36, No. 6, p. 555 (2000).

Over the guide portion that has been poled, the material has asymmetry that induces non-linear effects linked to the increase in its second order non-linear susceptibility $\chi^2$. In particular, that asymmetry locally modifies the index profile of the waveguide on subsequently applying an external electric field to the poled region and thus creates a reconfigurable index profile.

Nevertheless, that solution for producing tunable optical filters has technical implementation problems. In particular, the external control electrical field applied to the poled region necessitates the placing of electrodes inside the guide, which creates birefringence in the case of an optical fiber.

Also, although thermal poling exhibits controlled evolution over time, the effect induced is still small, in order for it to be used in optical systems. As for optical poling, the effect induced is highly unstable and thus as yet very far from being usable. Besides, a periodic increase in $\chi^2$ for creating or modifying a periodic non-linear index with a period corresponding to filtering at telecommunication wavelengths (approximately 530 nm for a wavelength of 1.5 µm) can be obtained only with optical poling. That is because only laser irradiation can achieve this resolution, and not the application of a high temperature.

The object of the present invention is therefore to address the problems of the prior art and to propose a tunable optical filter that dispenses with non-optical external tuning control.

To this end, the invention proposes to use optical control based on the Kerr effect, which is related to the $3^{rd}$ order susceptibility of the material constituting the waveguide. The guide is therefore prepared by incorporating semiconductor nanoparticles adapted to have a given third order susceptibility at a given frequency, and optical control is then effected by longitudinal coupling into the guide in order to produce an index variation proportional to said $3^{rd}$ order susceptibility by the Kerr effect.

The present invention more particularly provides a tunable optical filter comprising an index grating produced in a waveguide defining a longitudinal direction of propagation of an incident optical signal, said grating being defined by a plurality of optical parameters, which filter is characterized in that the optical guide contains semiconductor nanoparticles and in that the index grating is made up of a refractive index variation in the guide that is at least partly induced by a Kerr effect linked to the $3^{rd}$ order dielectric susceptibility ($\chi^3$) of said nanoparticles, at least one of said parameters of said index grating being modified by application of an optical control signal coupled into the guide and propagating longitudinally in said guide.

In one embodiment the refractive index variation in the guide is partly induced by permanent optical writing using ultraviolet (UV) irradiation.

In another embodiment the refractive index variation in the guide is entirely induced by the non-linear effect.

In one embodiment the optical control signal has a wavelength different from the wavelength of the incident optical signal in the guide and a power greater than that of the incident optical signal in the guide.

Depending on the application, the semiconductor nanoparticles contained in the waveguide are made up of Si—Ge or II-VI or III-V materials or elements of tellurium.

The invention also provides a method of producing a tunable optical filter consisting of an index grating disposed in an optical waveguide, which method is characterized in that it comprises the following steps:

inserting semiconductor nanoparticles into the waveguide;

adjusting the size and the shape of said nanoparticles to obtain a high $3^{rd}$ order dielectric susceptibility ($\chi^3$) over a portion of the guide; and applying an optical control signal coupled longitudinally into the guide to modify a parameter of the index grating by the Kerr effect.

DETAILED DESCRIPTION OF EXEMPLARY EMBODIMENTS OF THE INVENTION

Figure 1:
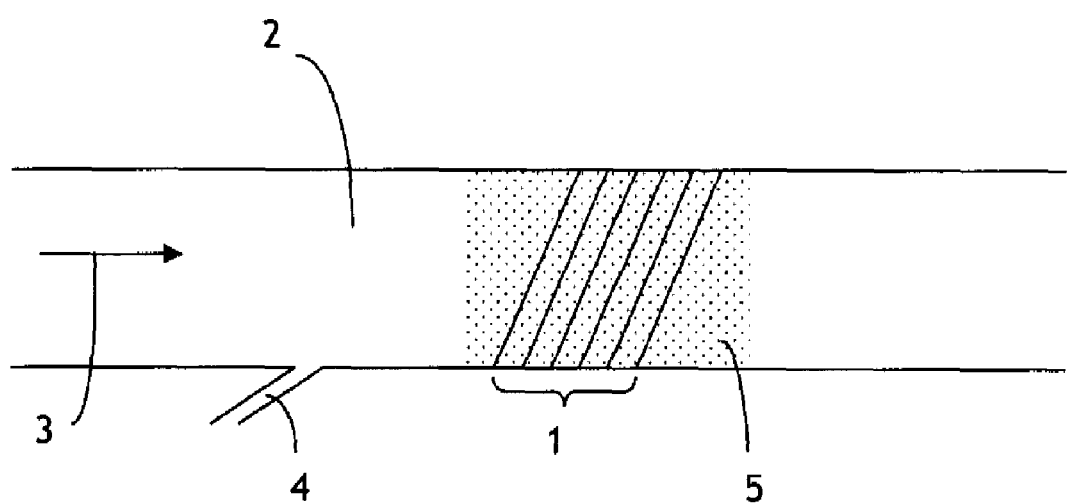
FIG. 1 shows a tunable optical filter according to an exemplary embodiment of the present invention.

In one embodiment, the method further comprises a step of optically writing a Bragg grating in the guide portion containing the nanoparticles.

Depending on the application, the nanoparticles having a high $3^{rd}$ order dielectric susceptibility ($\chi^3$) are distributed continuously or periodically over the guide portion.

FIG. 1 shows a tunable optical filter according to an exemplary embodiment of the present invention. The tunable optical filter includes an index grating 1 made up of a refractive index variation in an optical waveguide 2. The waveguide 2 defines a longitudinal direction of propagation 3 of an incident optical signal. At least one optical parameter of the index grating can be tuned by application of an optical control signal 4 coupled into the guide 2 and propagating longitudinally in the guide 2.

The optical waveguide 2 contains semiconductor nanoparticules 5 that are continuously or periodically distributed over the guide portion 2. The nanoparticules 5 have a $3^{rd}$ order dielectric susceptibility $\chi^3$. An optical control signal 4 adapted to the nanoparticules 5 causes a variation of the refractive index by the Kerr effect.

The invention may be applied to an optical system comprising an optical connection and at least one tunable optical filter according to the invention, the optical control signal being coupled to the waveguide from said optical connection.

The features and advantages of the present invention will become more clearly apparent on reading the following description, which is given by way of illustrative and non-limiting example.

The present invention consists in optically controlling an index grating to tune at least one parameter of the grating to modify the spectral response of the optical filter constituted by the grating.

It must be remembered that the parameters of the spectral response of an optical filter are the wavelength and the contrast. In the case of an index grating, these parameters are linked, in the case of the former to the effective index $n_{eff}$ of the guide and to the period $\Lambda$ of the grating and in the case of the latter to the index modulation $\Delta n_{mod}$ of the grating. The effective index $n_{eff}$ of the guide is linked to the refractive index n of the material of the guide and to the average refractive index variation $\Delta n_{avg}$ induced along the guide portion comprising the grating, and the index modulation $\Delta n_{mod}$ is linked to the index variations around the average refractive index variation value $\Delta n_{avg}$.

Accordingly, modifying these parameters of the grating ($\Delta n_{avg}$, $\Delta n_{mod}$, $\Lambda$) leads to a modification of the spectral response of the filter, either by offsetting the wavelength or by modifying the contrast.

According to the invention, the filter consists of an index grating produced in a waveguide comprising semiconductor nanoparticles that induce in the core and/or the cladding of the guide a third order dielectric susceptibility $\chi^3$.

The semiconductor nanoparticles have a high value of $\chi^3$ if their size $R_{NP}$ is much smaller than the Bohr exciton radius $R_{Bohr}$. It has been established that $\chi^3$ increases in proportion to $[R_{Bohr}/R_{NP}]^6$ and may reach a value three to four times greater than that of a solid semiconductor. These results were published by S. Lettieri et al. in "Nonresonant Kerr effect in microporous silicon: Nonbulk dispersive behavior of below band gap $\chi^3$ ($\omega$)", Journal of Applied Physics, Vol. 91, No. 9, p. 5564 (2002).

Accordingly, by appropriately adjusting the size of the semiconductor nanoparticles incorporated into the core and/or the cladding of the guide, as well as the fraction of the volume of the guide occupied by these nanoparticles (the filling ratio), it is possible to create in an optical guide portion a third order susceptibility $\chi^3$ that introduces a non-linear effect.

The size of the nanoparticles determines in particular the optical control frequency $I(\omega_0)$. The nanoparticles are effectively excited by a luminous signal of high intensity for a given frequency $\omega_0$. The asymmetry in the guide introduced by $\chi^3$ causes a variation of the refractive index by the Kerr effect resulting from the action of the control signal $I(\omega_0)$. Simulation shows that an optical control signal of around 100 mW may induce an index variation $\Delta n$ of the order of $10^{-4}$ in a region of the guide having a high value of $\chi^3$.

The filter according to the invention consists of an index grating produced in a guide comprising semiconductor nanoparticles. According to the invention, at least one parameter of the index grating is tuned by modifying the dielectric properties of the guide, in particular by excitation of $\chi^3$ by means of an optical control signal $I(\omega_0)$ coupled longitudinally into the guide.

The disposition of the nanoparticles along the optical guide defines regions of non-linearity that may be continuous or periodic, depending on the intended application.

In one embodiment, an index grating may be written optically into a photosensitive region of the guide, in the conventional way, introducing a $\Delta n_{mod}$ and/or a $\Delta n_{avg}$. Semiconductor nanoparticles are distributed continuously in this region of the guide. An optical control signal $I(\omega_0)$ adapted to said nanoparticles induces a non-linear effect linked to the $3^{rd}$ order dielectric susceptibility $\chi^3$ of the nanoparticles, which leads to a modification of $\Delta n_{avg}$ and/or $\Delta n_{mod}$ by the Kerr effect, thereby modifying the wavelength and/or the contrast of the filter.

In another embodiment, nanoparticles are distributed periodically over a region of the guide and the optical control signal $I(\omega_0)$ adapted to said nanoparticles induces a non-linear effect linked to the $3^{rd}$ order dielectric susceptibility ($\chi^3$) of the nanoparticles that modifies or generates a $\Delta n_{mod}$ and/or a $\Delta n_{avg}$ by the Kerr effect, thereby modifying or creating an index grating filter. In this embodiment, if the index modulation is created, the index grating is in a latent state until the optical control signal is applied, i.e. an optical filter may be introduced on command, for example to add or drop a multiplex signal channel.

The optical control signal is coupled into the optical guide in a manner that is known in the art and similar to coupling a pump signal into a doped fiber amplifier. The optical control signal is emitted at a wavelength corresponding to the excitation frequency ($\omega_0$) of the semiconductor nanoparticles, this wavelength $\lambda(\omega_0)$ being different from that of the incident signal, and with a power $P_{I(\omega_0)}$ much greater than the power of the incident optical signal. Accordingly, the dielectric properties of the guide are not modified by the transmission optical signal but only by the control signal, whose power excites the semiconductor nanoparticles and causes an increase in $\chi^3$.

The filter of the invention must therefore preferably be disposed at a great distance from the output of the optical amplifier and must not be disposed in optical systems transmitting high-power signals, the power of the control signal being generally a few hundred milliwatts.

The semiconductor nanoparticles are chosen to have a high $3^{rd}$ order susceptibility $\chi^3$ and may consist of Si—Ge, II-VI or III-V materials, or elements of tellurium, for example. The nanoparticles may be incorporated directly into the silica matrix of the guide, with a radius $R_{NP}$ much smaller than $R_{Bohr}$, using conventional techniques, such as chemical vapor phase deposition (CVD) or the sol-gel technique. For certain semiconductor compositions, the nanoparticles may be fabricated by heat treatment or laser irradiation of the guide previously doped with the corresponding materials. The size of the nanoparticles, which determines the optical control frequency activating $\chi^3$, may be adapted by laser irradiation.

Depending on the embodiment, the nanoparticles are disposed over a region in the guide in a continuous manner or in a periodic manner. A periodic distribution may be obtained by a nucleation process or by destroying a homogeneous distribution by increasing the size of certain nanoparticles up to a size greater than $R_{Bohr}$, which renders them unresponsive to the activation control signal.

A tunable optical filter has been fabricated in this way consisting of an index grating reconfigurable under optical control. The tuning response time of the filter is considerably reduced, of the order of a few picoseconds. The optical control signal is coupled into the guide longitudinally, which eliminates the need for electrical, thermal or mechanical control as used in the prior art. The filter is also totally integrated into the guide, which limits insertion losses, and independent of polarization when produced in an optical fiber.

The invention claimed is:

1. A tunable optical filter comprising an index grating produced in a waveguide defining a longitudinal direction of propagation of an incident optical signal, said grating being defined by a plurality of optical parameters, which filter is characterized in that the optical guide contains semiconductor nanoparticles and in that the index grating is made up of a refractive index variation in the guide that is at least partly induced by a Kerr effect linked to the $3_{rd}$ order dielectric susceptibility ($\chi^3$) of said nanoparticles, at least one of said parameters of said index grating being modified by application of an optical control signal coupled into the guide and propagating longitudinally in said guide.

2. An optical filter according to claim 1, characterized in that the refractive index variation in the guide is partly induced by permanent optical writing using ultraviolet (UV) irradiation.

3. An optical filter according to claim 1, characterized in that the refractive index variation in the guide is entirely induced by the non-linear effect.

4. An optical filter according to claim 1, characterized in that the optical control signal has a wavelength different from the wavelength of the incident optical signal in the guide.

5. An optical filter according to claim 1, characterized in that the optical control signal has a power greater than that of the incident optical signal in the guide.

6. An optical filter according to claim 1, characterized in that the semiconductor nanoparticles contained in the waveguide are made up of Si—Ge or II-VI or III-V materials or elements of tellurium.

7. An optical system comprising an optical connection and at least one tunable optical filter according to claim 1, characterized in that the optical control signal is coupled into the waveguide from said optical connection.

8. A method of producing a tunable optical filter consisting of an index grating disposed in an optical waveguide, characterized in that it comprises the following steps:
 inserting semiconductor nanoparticles into the waveguide;
 adjusting the size and the shape of said nanoparticles to obtain a high $3^{rd}$ order dielectric susceptibility ($\chi^3$) over a portion of the guide; and
 applying an optical control signal coupled longitudinally into the guide to modify a parameter of the index grating by the Kerr effect.

9. A method according to claim 8, characterized in that it further comprises a step of optically writing a Bragg grating in the guide portion containing the nanoparticles.

10. A method according to claim 8, characterized in that the nanoparticles having a high $3^{rd}$ order dielectric susceptibility ($\chi^3$) are distributed continuously over the guide portion.

11. A method according to claim 8, characterized in that the nanoparticles having a high $3^{rd}$ order dielectric susceptibility ($\chi^3$) are distributed periodically over the guide portion.

* * * * *